(12) United States Patent
Christensen et al.

(10) Patent No.: US 7,248,893 B2
(45) Date of Patent: Jul. 24, 2007

(54) MULTI-FUNCTIONAL RESIDENTIAL COMMUNICATION APPROACH

(75) Inventors: Steve Christensen, Richmond, KY (US); Hector Aguirre, Lexington, KY (US); Robert P. Farinelli, Lexington, KY (US)

(73) Assignee: ELAN Home Systems, L.L.C., Lexington, KY (US)

( * ) Notice: Subject to any disclaimer, the term of this patent is extended or adjusted under 35 U.S.C. 154(b) by 140 days.

(21) Appl. No.: 10/773,126

(22) Filed: Feb. 5, 2004

(65) Prior Publication Data

US 2004/0176141 A1    Sep. 9, 2004

Related U.S. Application Data

(60) Provisional application No. 60/445,295, filed on Feb. 5, 2003.

(51) Int. Cl.
*H04Q 7/20* (2006.01)

(52) U.S. Cl. ............... 455/556.1; 455/41.2; 455/3.03; 455/419

(58) Field of Classification Search ........... 455/418, 455/419, 422.1, 41.2, 556.1, 3.02, 3.03
See application file for complete search history.

(56) References Cited

U.S. PATENT DOCUMENTS 5,802,467 A * 9/1998 Salazar et al. ............. 455/420
6,374,079 B1 * 4/2002 Hsu ............................ 455/11.1

OTHER PUBLICATIONS

*VIA! SC-4 RS232 System Controller Reference Manual*, Elan Home Systems, 2001, pp. 1-24. (See, e.g., "SC-4 controller" of Figure 1.).
*VIA!64 Color LCD Touch Panel Installation Manual*, Elan Home Systems, 2000, pp. 1-11. (See, e.g., "wireless touch panel" of Figure 1.).
Dec. 2002, *VIA! Tools, Product Family SetUp Software Reference Manual 3.0*, Elan Home Systems, Nov. 2002, pp. 1-192.
*VIA! SC-4 Programming Manual*, Elan Home Systems, 2001, pp. 1-17. (See, e.g., "SC-4 controller" of Figure 1.).

(Continued)

*Primary Examiner*—Temica Beamer
(74) *Attorney, Agent, or Firm*—Crawford Maunu PLLC

(57) ABSTRACT

A signal-repeating device control arrangement facilitates user control of various types of media equipment in a facility. According to an example embodiment of the present invention, the different types of user-controllable media equipment are located with respective user-interface units in various zones of the facility to provide user-selectable interaction for the user. The signal-repeating device control arrangement includes a transceiver for wirelessly communicating with a user's remote control, a data-routing circuit for communication with packet-communicating devices such as over an Ethernet, and an emulation circuit for providing an interface to manufacturer-specific equipment for control of other devices types and/or user input devices. Another aspect of the invention is directed to a related arrangement in which the base station includes a data port adapted to download information for configuring both the signal-repeating base-station and, via the base-station transceiver, for configuring the user-interface control device.

14 Claims, 4 Drawing Sheets

OTHER PUBLICATIONS

*Crestron ST-CP SmarTouch™ Controller Processor Operations Guide*, pp. 1-10. (See, e.g., "wireless basestation" of Figure 1.).

*CorAccess Systems Home Management Interfaces*, product brochure, pp. 1-2. (See, e.g., "wireless touch panel" of Figure 1.).

*CorAccess Touchscreen*, product companion brochure, pp. 1-2. (See, e.g., "wireless touch panel and SC-4 Net controller" of Figure 1.).

*CorAccess Mobile Companion Home Theater system*, product brochure, p. 1. (See, e.g., "wireless touch panel" of Figure 1.).

* cited by examiner

MULTI-FUNCTIONAL RESIDENTIAL COMMUNICATION APPROACH

RELATED PATENT DOCUMENTS

This is a conversion of U.S. Provisional Patent Application Ser. No. 60/445,295, entitled "Multi-functional Residential Communication System," and filed on Feb. 5, 2003, to which priority is claimed under 35 U.S.C. §119. The subject matter of this underlying patent document as well as its attached appendices, are incorporated herein by reference.

FIELD AND BACKGROUND OF THE INVENTION

The present invention relates generally to signal routing schemes for routing signals, such as audio and video signals, to designated facility areas (or "zones") and, more particularly, to distribution control arrangements for routing and controlling such signals.

Home owners are rapidly becoming aware of the benefits of combining the media functionality of their primary PCs (personal computer) with consumer electronics products, such as televisions and stereos. These benefits include convenient access to the household PCs, televisions and stereos throughout the home, and more efficient use of space and savings in the form of fewer system components.

In an effort to accommodate this device-integration interest by consumers, one relatively-recent approach is the provision of a crossover-type product. A crossover-type product integrates PC and television functions to bring the PC into the realm of the home entertainment center. This approach typically provides integration of conventional PC-functionality with Internet access, live television programming capabilities via remote control or keyboard and mouse, and video recording functions for playing and recording television programs and gaming options. With increased availability of multi-media consumer products, such as CD-ROM burners and DVD, there appears to be an increased diversification and interest in providing various types of PC-TV cross-over products.

Recognizing the above-discussed approach to consumer demands, the present invention addresses additional concerns and needs that further enhance consumer convenience without undermining the benefits of combining the multi-media functionality with the functionality of the household PCs. Some of these additional concerns and needs include: the impact of low-cost networked wireless PCs and web pads on the home system infrastructure; existing devices needing control by either IR or hard-wired "serial link" interfaces or both; a clean solution to bridge to these types of interfaces for convenient and flexible equipment control; and/or an ability to add features to the consumer equipment and new consumer equipment itself without the problems associated with the obsolescence of hardware.

Moreover, many existing crossover products merely connect one staple product with another staple product while carrying into the "integrated" system the lowest-level features of each product type. For example, a crossover product that connects the stereo and the TV set would permit the consumer to access information content (such as listen to the radio or their favorite album) only after waiting for the PC to boot up, or to turn on the TV just to select a radio station. While finding their way to market quickly, these configuration schemes are often manufactured without sufficient engineering forethought to simplicity and ease of use.

The above-discussed issues and others have presented challenges.

SUMMARY OF THE INVENTION

The present invention is directed to addressing and overcoming the above-mentioned challenges and others in the above-discussed application areas as well as others. The present invention is exemplified in a number of implementations and applications, some of which are summarized below.

According to the present invention, one example embodiment is directed to a signal-repeating device control arrangement for use in a facility having different types of user-controllable devices. The different types of user-controllable devices are co-located with respective user-interface units in various zones of the facility and provide user-selectable information to the user. The respective user-interface units provide input selectors for controlling operation of the user-controllable devices, and the signal-repeating device control arrangement addresses the impact of multi-room distributed audio/video and entertainment in the networked home.

In another particular embodiment of the present invention, the unique configuration of the homeowner's system is embedded into the user interface to greatly enhance the user's experience, for example, without displaying information unnecessary to the control of the selected equipment, and with access to the equipment being automated to minimize the number of button pushes to achieve the desired results.

Another example embodiment of the present invention is directed to a signal-repeating device control arrangement that facilitates user control of various types of media equipment in a facility. The different types of user-controllable media equipment are located with respective user-interface units in various zones of the facility to provide user-selectable interaction for the user. The signal-repeating device control arrangement includes a transceiver for wirelessly communicating with a user's remote control, a data-routing circuit for communication with packet-communicating devices such as over an Ethernet, and an emulation circuit for providing an interface to manufacturer-specific equipment for control of other device types and/or user input devices.

In another example embodiment of the present invention, such a signal-repeating device control arrangement has a wireless base station adapted to include a data port that downloads information for configuring both the signal-repeating base-station and, via the base-station transceiver, for configuring the user-interface control device.

Other embodiments of the present invention are directed to approaches (arrangements and methods) for using the above-summarized devices, approaches for routing signals and commands between these devices, and approaches for using various combinations of these devices for providing convenient and flexible control between the target terminals (e.g., media devices) and the user-control devices (e.g., touch panels).

The above summary of the present invention is not intended to describe each illustrated embodiment or implementation of the present invention. While the figures and the associated discussion that follows more particularly exemplify some of these embodiments, it will be appreciated that many other embodiments are encompassed in the discussion that follows.

BRIEF DESCRIPTION OF THE DRAWINGS

The invention may be more completely understood in consideration of the detailed description of various embodiments of the invention in connection with the accompanying drawings, in which.

Figure 1:
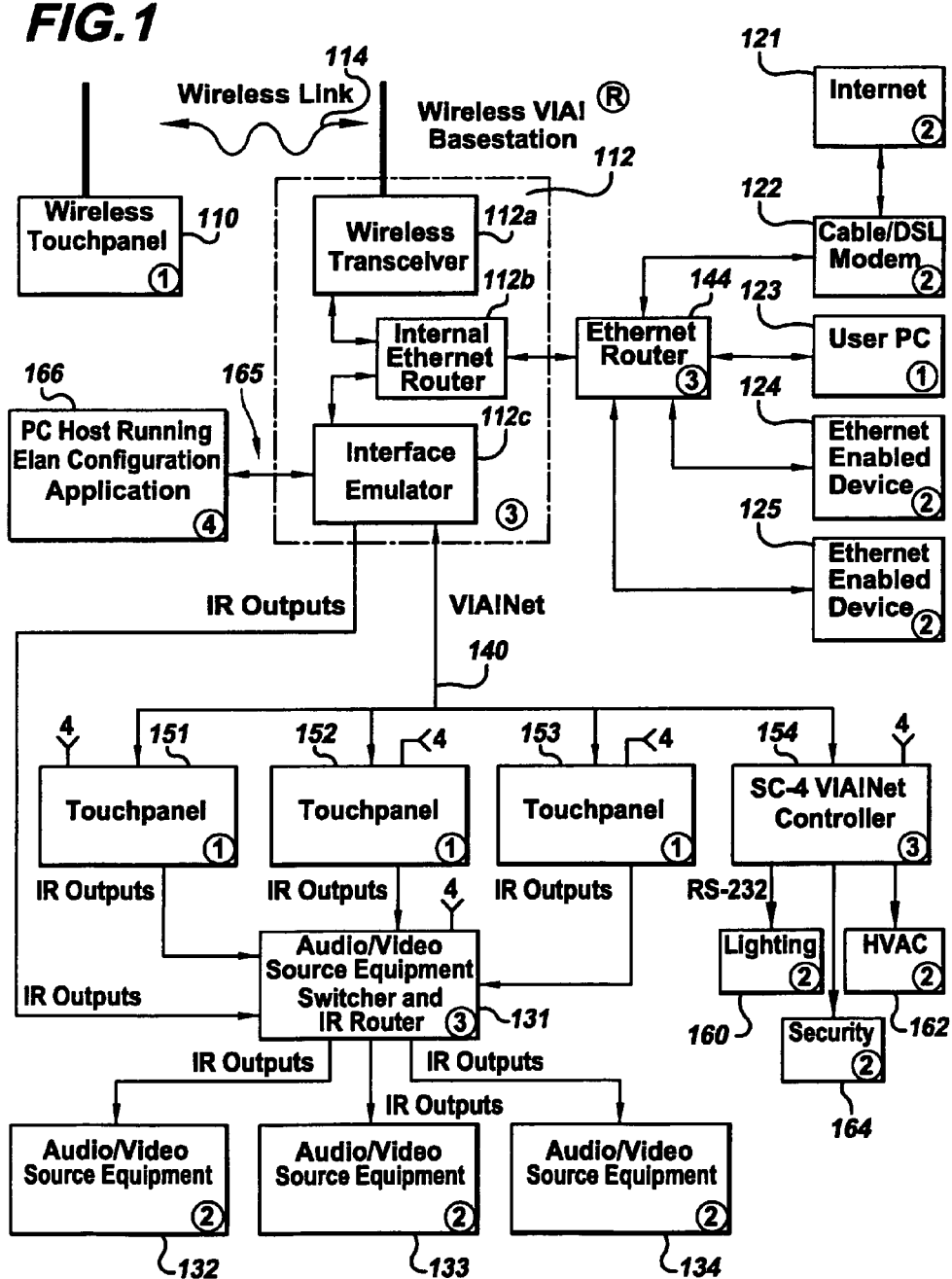
FIG. 1 is a block diagram of a system involving control by a wireless base station, according to one embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION OF ILLUSTRATIVE EXAMPLES

The present invention is believed to be applicable to a variety of home-like audio-video applications including those in which the user would desire convenient and user-friendly control over several of singular or multi-media devices. Various example embodiments of the present invention have been found to be particularly advantageous for applications in which user-controllable media devices are adapted for user control via controls that are available or installed in various zones within the facility (or home). While the present invention is not necessarily limited to such applications, various aspects of the invention may be appreciated through a discussion of various examples using this context.

According to a first example, the present invention is embodied in a signal-repeating device control arrangement for use in a facility having different types of user-controllable devices that are co-located with respective user-interface units in various zones of the facility. Examples of such user-controllable devices include intercom and camera-monitoring arrangements, entertainment devices such as televisions and stereos, and PC-type devices that provide functions such as networking, internet access and gaming.

The user-interface units provide input selectors for controlling operation of the user-controllable devices via the signal-repeating device control arrangement. The user-interface units would typically be a portable handheld-type, or wall-installed, remote control unit. The signal-repeating device control arrangement includes a signal-repeating base-station for use in communicating with the zone-located user-controllable devices and a user-interface control device. The user-interface control device has a keypad or display touchpad for receiving inputs from a user and a transceiver for sending data wirelessly in response to the user inputs and for receiving data. In this particular embodiment, the signal-repeating base-station is installed in a location of the facility that is convenient and amenable to wireless communication and, if applicable, to wiring for one or more wired user-controllable devices. The base station includes a transceiver that is designed to send data to and receive data from at least one of the user-interface control devices. The base station also includes a data-routing circuit adapted to respond to the user inputs received via the base-station transceiver by sending designated groups of digital data sets (e.g, data packets) to manipulate operation of at least one of the different types of user-controllable devices.

Referring now to the figures, FIG. 1 illustrates another example of the present invention. In this embodiment, a (fixed or portable) wireless touch panel 110 communicates with a base station 112 over a wireless communication link 114 to establish data communication links with various types of media terminals. The illustrated media terminal types include Ethernet communicable devices 121–125, devices 131–134 responding to infrared (IR) signaling, and devices for which communication is provided using a manufacturer-specific (versus industry standard) link 140. In this example, the manufacturer-specific link 140 is shown providing communication and control for VIA! Net™ devices that are manufactured and made commercially available by Elan Home Systems of Lexington, Ky. While it is expected that different applications would benefit from other types and combinations of devices, the skilled artisan would appreciate that other and/or alternative device types can be used as the device types selected and described in connection with FIG. 1 are for illustrative purposes only.

In the typical application, user commands are generated in response to inputs selected via the wireless touch panel 110. As mentioned above, the base station 112 communicates with the wireless touch panel 110 via the wireless communication link 114. To accommodate this communication path, the base station 112 includes a wireless transceiver 112a ("transceiver" being used conventionally to refer to a circuit providing information receiving and information transmitting functions).

For communicating with the Ethernet communicable devices 121–125, the base station 112 includes an internal Ethernet router 112b that is connected to another Ethernet Router 144. The Ethernet Router 144 is conventional and acts as a hub to permit the base station 112 to interface with the Ethernet communicable devices 121–125.

For communicating with the manufacturer-specific devices, as mentioned above the illustrated embodiment employs IR as the example communication tool. For the illustrated manufacturer-specific communication, the base station 112 includes an interface emulator 112c that sends commands to emulate communication protocol as would be processed by another of the manufacturer's media devices or generic media devices. Example devices that communicate using such a manufacturer-specific protocol employ a two-way communication link 140 and include VIA! ® touch panels 151–153 (FIGS. 3A and 3B) and an SC-4 (VIA! Net) controller 154, each available from Elan Home Systems as characterized in the attachments to the underlying provisional patent document.

As another communication tool for audio/video source equipment such as items 132–134, the audio/video source equipment switcher and router 131 accepts token IR commands from each of the control panels and transmits source specific IR commands to each of the audio/video Sources shown at the bottom of FIG. 1. The switcher and router 131 also acts as an IR pass through so that each of the control devices can send IR commands directly to the source equipment.

The controller 154 provides remotely-controlled switching for controlling miscellaneous household appliances such as lighting, HVAC and security control blocks 160, 162 and 164, respectively. Communication with such devices is provided over an RS232 Serial Link, with RS-232 control signals being generated in the SC-4 controller. The controller 154 provides an interface between the VIA! Net devices and up to four RS-232 controllable devices. This controller is configured with a simple serial interface link from the PC host running the VIA! tools configuration program. Token command software translators provide a routing and communications means to each RS-232 device connected to the controller 154.

Although such emulation could readily be adapted for other products, in the illustrated embodiment of FIG. 1, the interface emulator 112c is adapted to emulate the communication interface of a VIA! Touchpanel user control panel by way of a two-way communication link sending. The VIA! interface emulator 112c includes a microcomputer circuit (not shown) that is programmed to provide the interface bridge between the wired touch screens and the Ethernet router. Further, VIA! interface emulator 112c can be adapted to communicate as an Ethernet-type device or with a dedicated port for communicating with the wireless transceiver 112a through the internal Ethernet router 112b.

A download link 165 (e.g., USB, RS422, RS232) permits the interface emulator 112c to accept configuration and/or program instruction data from an external data downloading device 166 which could be a programmed computer or as simple as a memory bank with transferable data. In a specific embodiment and application, the external data downloading device is a PC (personal computer) that runs a manufacturer-specific configuration application to download custom configuration files to the VIA! interface emulator 122c, each of the hard wired VIA! touch panels 151–153, and the SC-4 VIA! Net™ controller 154. Using a simple serial interface link for downloading from the PC host 166, a predefined download program (e.g., running a VIA! tools configuration program) can be used with token command software translators providing a routing and communications means to the Internal Ethernet router. XML control and configuration data can also be formatted for transmission through the Internal Ethernet Router to the wireless transceiver, over the wireless link and to the wireless touch panel.

As an example of remote control of generic media devices by the wireless touch panel 110, the interface emulator 112c is adapted to include conventional audio and/or video equipment 132–134 which respond to infrared (IR) signaling commands generated from the interface emulator 112c that, in turn, responds to commands from the wireless touch panel 110. Infrared control signals labeled as IR outputs are generated in any of the touch panels, for example, 110 and 151, the audio/video switcher and router 131 or the VIA! interface emulator 112c. Examples of such conventional audio and/or video equipment include televisions, recording devices, DVD, and digital, magnetic and other data-retaining technology. As is conventional, infrared coding for such devices can be manufacturer-specific and/or standardized.

Accordingly, once configured via downloading device 166, the wireless touch panel 110 and the base station 112 can be used to control a multitude of media devices in zones (e.g., rooms and other dwelling areas) throughout the facility. From a functional perspective, the user has the ability to control any of the media devices directly or via a remote device such as one of the (wireless or wired) touch panels. In FIG. 1, the blocks identified with an encircled "1" in the lower right hand corner are user control surfaces (in some embodiments, such "surfaces" include more conventional engageable keys or buttons) as found in a wireless or wired touch screen and a PC.

The blocks identified with an encircled "2" in the lower right hand corner are media devices to be controlled by the user. There are three forms of control access as illustrated and including Ethernet-communicating devices that are connected to the system with a standard Ethernet router 144. Because each of these devices has a unique IP address, they can be readily accessed and controlled by the wireless touch screen and wired touch panels.

The blocks identified with an encircled "3" in the lower right hand corner are routing and interface devices that bridge signals between the control surfaces and the devices to be controlled. For example, these routers can be implemented as: an Ethernet Router which is a standard multi-port device that can be configured in 10 Base T, 100 Base T router or switch configurations. No special set up is required to use this device and it is not programmable. However, the IP addresses of each device are connected to the Ethernet as set in each connected device.

In a typical application, an installer would configure a system personality on the PC 166 (FIG. 1) based on the specific attributes of each of the devices to be controlled for the particular facility being equipped. Such a program would create a configuration file that is downloaded into each of the user control surfaces (or panels such as 151–153 of FIG. 1) and each of the routing and control interface devices such as 144 and 154 of FIG. 1). The ELAN VIA! Tools configuration program is an example of such a program (as described in the manual attached to the underlying provisional patent document). Data is specifically formatted for each of the devices to be receiving downloaded data; these devices being, for example, the interface emulator 112c, the touch panels 151–153, and the controller 154. This approach provides a convenient method for the installer to completely configure the system with one easy-to-use program Once the configuration files have been downloaded into the base station 112, data is then transmitted from the base station to the touch screen utilizing XML transfer protocol over the wireless link. In one more particular example, the wireless touch screen is a hand held PC with built in 802.11b wireless communications module. The commercially-available CorAccess "Mobile Companion" is such a touch screen.

Figure 2:
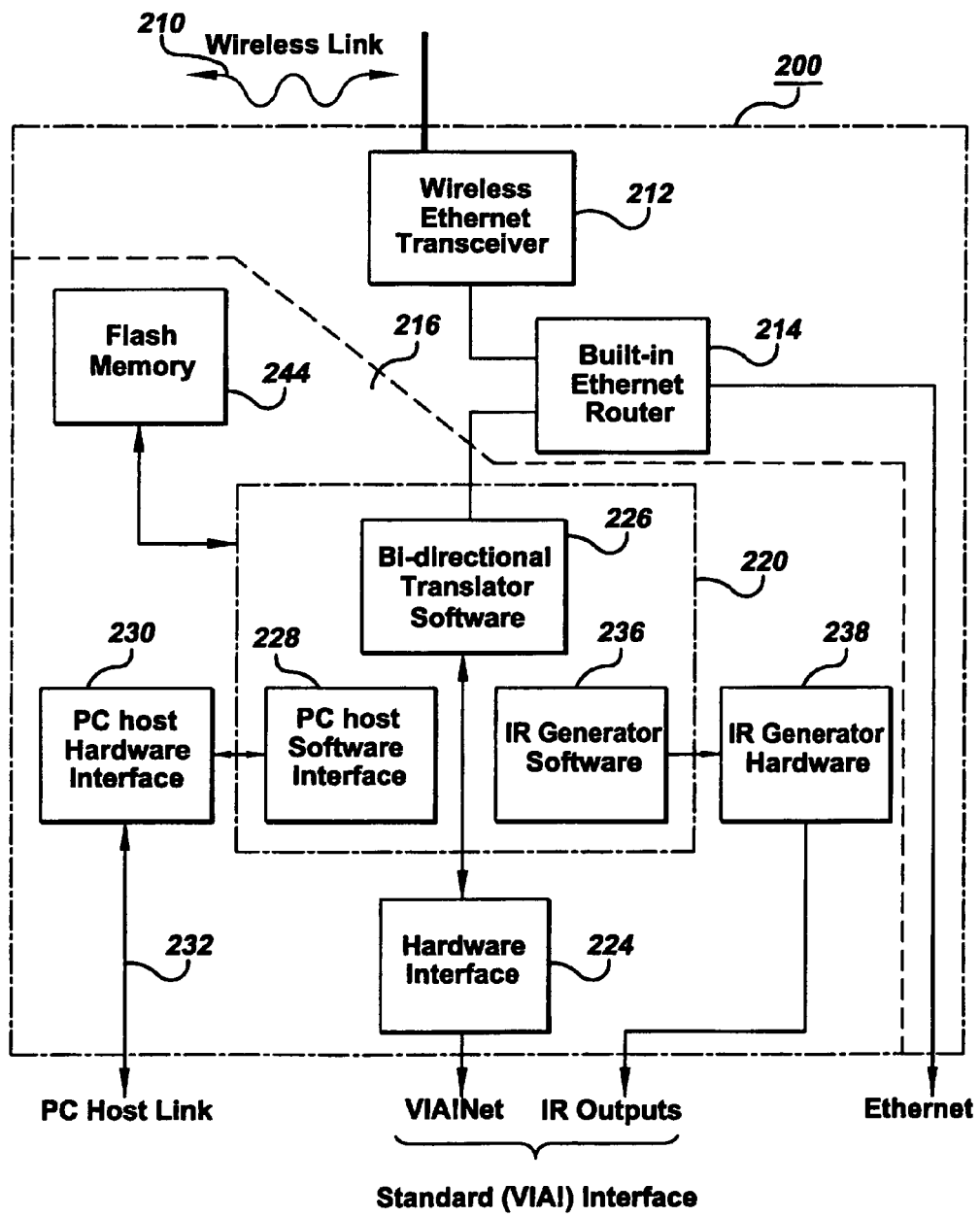
FIG. 2 is an example with an expanded view of how the wireless base station can be implemented, according to a specific embodiment of the present invention.

With reference to both FIGS. 1 and 2, FIG. 2 illustrates a particular example embodiment 200 of the wireless base station 112 of FIG. 1, with the wireless base station 200 using a wireless link 210 to communicate with a wireless communications module such as the commercially-available CorAccess "Mobile Companion" or its alternative.

Dashed lines are used to illustrate certain subsections of the wireless base station 112. These subsections include an emulator interface 216 and microprocessor 220. The emulator interface 216 encompasses all of the wireless base station 112 except the transceiver 212 and the Ethernet router 214. The microprocessor 220 is depicted with its main software blocks set out as including a bidirectional translator 226 for providing a communication interface between the Ethernet router 214 and a VIA! NET hardware interface 224, a PC-host interface 228 for interfacing with a PC-host hardware interface 230 (which, in turn, couples to the PC host link 232), and an infrared (IR) code generator 236 for interfacing with a circuit 238 that generates the IR outputs. As depicted at the bottom of FIG. 2, the IR (wireless)

outputs and VIA! Net (wired) outputs provide an interface that is standard for VIA!-type products available from Elan Home Systems.

For implementing the transceiver 212 and Ethernet router 214 shown in FIG. 2, the commercially-available CorAccess "Access Point" base station can be used. In this regard, the base station transceiver 212 has a built-in 802.11b wireless communications module that is compatibly communicative with the wireless touch panel (e.g., 110 of FIG. 1). By incorporating the emulator interface, shown as 216 in FIG. 2, with the transceiver 212 and Ethernet router 214 as a single device, legacy equipment can be controlled as described herein.

The wireless base station can be implemented using various types of programmable, semi-programmable, discrete logic circuits, and combinations thereof. A particular programmable implementation is characterized as follows. The microprocessor 220 is implemented using a multitasking microprocessor such as an 8051-based Dallas Semiconductor DS80C320 processor with a built-in Ethernet hardware interface and software protocol stack. A flash memory circuit 244 is used for storage of executable and downloaded configuration data and program code. The PC host hardware interface 230 is an RS-232 transceiver such as a Maxim MAX232ECPE device. The VIA Net hardware interface 224 is an RS-485 transceiver such as a Maxim MAX3085CSA device. The JR generator hardware 238 is a simple interface buffer and voltage translator connected to a port pin on the microprocessor; this circuit can be realized using one or more NAND gates and NPN transistor circuits (not shown).

The software components for this particular programmable implementation are characterized as follows. As described, the translator 226 is a software routine coded to translate between an Ethernet protocol and the VIA! Net protocol. The PC-host software interface 228 is a routine that provides hardware hand shaking control and error checking routines for the transfer of bulk data. The IR generator is a software routine that is based on data-table indexing and look-up of the applicable IR code parameters such as carrier frequency, modulation pulse position and repeat code parameters among others. Each of these routines can run in a multitasking environment on the above-exemplified microprocessor. Also, the RS-232 protocols used in connection with the controller 154 are standard 19,200 baud rate, N, 8, 1, no stop bits, no parity bit schemes, and the IR outputs from each of the devices are digital signals ranging in value from 0V to +12VDC. These digital signals are unique to the equipment they are associated with, and can be communicated using either pulse position modulated carrier envelopes or discrete pulses.

High-speed communication can be achieved using a manufacturer-specific communication protocol for a fan-type connectivity to touch panel and other user control devices. For instance, the Elan Home Systems VIA! Net SC-4 network controller can be used to provide bi-directional communication between a VIA! Net network controller, and up to 30 VIA! Net clients (e.g., VIA! touch panels). As a hardware interface, this type of controller uses a standard RS-485 half-duplex bi-directional line (meaning that one twisted pair is multiplexed between transmit and receive). All nodes (controller and clients) on the VIA! Net bus (140 of FIG. 1) are wired together in parallel without need for a buffering hub with unique line terminations.

Each VIA! Net client has a VIA! Net address between 1 and 30 inclusive. VIA! Net addresses 0 and 31 have special meaning, and will be addressed later in this document. During normal VIA! Net operation, the VIA! Net network controller polls each address from 1 to 30 to ask each client if it needs service. If a client needs service, it posts its service request immediately following its being polled by the network controller. If the client does not require service, it simply does not respond to the poll. If the network controller detects a non-response within 100 microseconds of the completion of the poll, it moves on to polling the next client address.

In addition to the service request polling described above, the VIA! Net controller broadcasts generic status information to all clients (with no address specified). This status information would include the configuration CRC, the time and date, zone/source information from the whole house audio system, security system status, HVAC status, etc. The configuration CRC is a 16-bit data word formed uniquely from the VIA! Tools configuration used to create the network controller and client's databases. When the network controller broadcasts its configuration CRC, the clients compare it against their own configuration CRC. When there is a match, the client knows that its configuration is "in sync" with that of the network controller. If they do not match, then it is clear that the client and the network controller were created by different configurations, and as such, service requests given by the client may map to unintended reactions by the network controller. As such, the client must not send service requests to the network controller if it detects a configuration CRC mismatch.

VIA! Net client uses two special addresses, address 31 and address 0. Address 31 is called the "direct" address. All clients respond to address 31 regardless of their real address (even if they have not been assigned a real address). Address 31 is used during configuration download, and not during regular network operation so as to avoid data collisions ensuing from multiple or all clients responding simultaneously (if this address were used during regular operation). During a configuration download, the client is given a network address, the configuration CRC (cyclic redundancy code), and its "personality" as is defined per the client specifications.

Address 0 is referred to as the "pass" address. An example of a device that uses the pass address is the VIA! Learner, offered by Elan Home Systems. This device is typically connected to a PC at its "PC Host" port, and to a VIA! Net client on its "download" port. With such a connection, the PC communicates with the VIA! Learner by address 31 (since it is directly connected to the VIA! Learner), and communicates with the VIA! Net client by address 0 (since this address passes through the VIA! Learner to reach the client). The VIA! Learner basically translates all address 0 messages from the PC, host port into address 31 messages going out the download port.

Figure 3A:
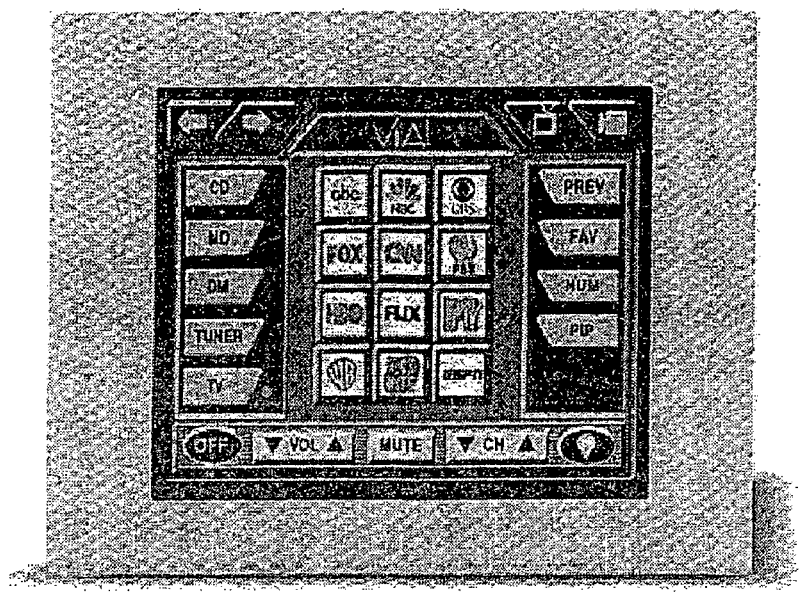
FIGS. 3A and 3B are enlarged views of a touch screen panel having different display screens, for use in the system of FIG. 1, with various user-selectable icons corresponding to media items to be controlled in response to the selection, according to another aspect of the present invention.
Figure 3B:
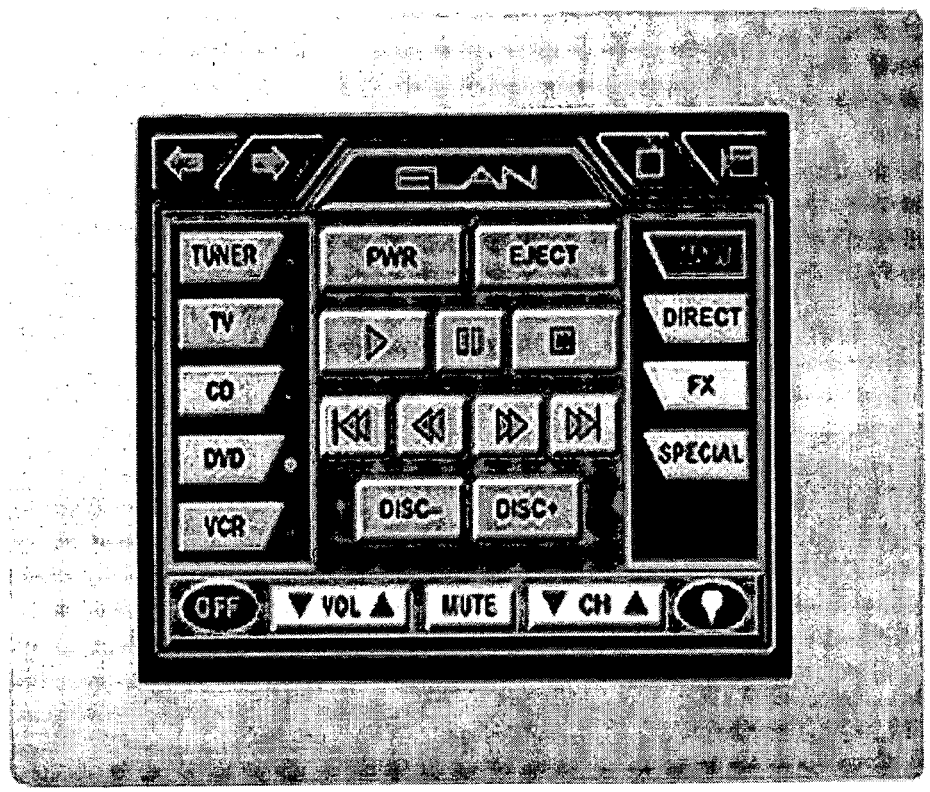

With reference to FIGS. 3A and 3B, when using a touch panel to implement the user-interface control devices, the touch panel's internal transceiver is not only used for sending data wirelessly in response to the user inputs and for receiving data from the base station transceiver, but also for receiving programmed configuration data for providing user control over the different types of user-controllable devices. Using the download link 165 and its connectivity via the wireless base station 112, this programmed configuration data can be provided during system installation at the factory or at the facility. FIG. 3A illustrates a touch panel configured at a level that displays selections of connected user-controllable devices along the sides and, in the center, display of available TV channels. FIG. 3B illustrates a comparable (or the same) touch panel with a display in the center region for control selections corresponding to a previously-selected one of the user-controllable devices.

APPENDIX AND OTHER REFERENCE MATERIALS

For specific examples of manufacturer-specific user-controllable devices and/or user-interface units, the skilled artisan would recognize that various commercially-available products would suffice including but not limited to VIA!64 Color LCD Touch Panel, and VIA! SC-4 RS232 System Controller as manufactured and sold by Elan Home Systems, as well as competitive products such those commercialized by Creston Electronics of Rockleigh, N.J. and CorAccess of Golden, Colo. For further information regarding these devices, reference may be made to Appendix B as attached to the above-referenced underlying Provisional Patent document.

For more specific examples of manufacturer-specific device implementation and examples of commands that are executable using the above-discussed and illustrated embodiments, reference may be made to the attached Appendix (Appendix B as attached to the underlying Provisional Patent document) entitled, VIA! Tools, Product Family SetUp Software Reference Manual 3.0, ELAN HOME SYSTEMS, November 2002, pages 1–192. This manual describes the functional aspects of various blocks shown in the figures, particularly those shown in FIG. 1.

It will be appreciated that the above-exemplified embodiments characterize many different aspects that, alone or in combination, are directed to inventive subject matter contemplated by and consistent with the present invention. Such other aspects and other embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims as properly construed under the law.

What is claimed is:

1. A signal-repeating device control arrangement for use in a facility having different types of user-controllable devices that are co-located with respective user-interface units in various zones of the facility and that provide user-selectable information to the user, the respective user-interface units providing input selectors for controlling operation of the user-controllable devices, the signal-repeating device control arrangement comprising:
a user-interface control device having a user interface for receiving inputs from a user and having a transceiver for sending data wirelessly in response to the user inputs and for receiving data;
for use in communicating with the zone-located user-controllable devices and the zone-located user-interface units, a signal-repeating base-station including
a base-station transceiver adapted to communicate data with the user-interface control device and the zone-located user-interface units, and
a data-routing circuit adapted to respond to the user inputs received via the base-station transceiver by sending designated groups of digital data sets to manipulate operation of at least one of the different types of user-controllable devices.

2. The signal-repeating device control arrangement of claim 1, wherein the user-interface control device further includes a display for communicating user data in response to data received from the signal-repeating base-station.

3. The signal-repeating device control arrangement of claim 2, wherein the display of the user-interface control device is a touch-panel display.

4. The signal-repeating device control arrangement of claim 1, wherein the user-interface control device includes a touch-panel display.

5. The signal-repeating device control arrangement of claim 1, wherein the transceiver of the user-interface control device is further adapted to communicate bi-directionally and wirelessly with the base-station transceiver.

6. The signal-repeating device control arrangement of claim 1, wherein the data-routing circuit includes a data processor that is programmable for controlling operation of the signal-repeating base-station and further includes a data-input circuit for downloading certain programming data.

7. The signal-repeating device control arrangement of claim 6, wherein the certain programming data is configuration data.

8. The signal-repeating device control arrangement of claim 6, wherein the certain programming data is program-execution code for execution by the data processor.

9. The signal-repeating device control arrangement of claim 1, wherein the data-routing circuit includes a programmable data processor that is adapted and programmed to emulate communication with the user-controllable devices, the communication being otherwise provided by at least one of the zone-located user-interface units.

10. The signal-repeating device control arrangement of claim 9, wherein the data-routing circuit communicates with at least one of the user-controllable devices via infrared signaling.

11. The signal-repeating device control arrangement of claim 1, wherein the data-routing circuit communicates with at least one of the user-controllable devices via infrared signaling.

12. The signal-repeating device control arrangement of claim 1, wherein the data-routing circuit includes a programmable data processor that is adapted and programmed to emulate communication with the user-controllable devices, the communication being otherwise provided by at least one of the zone-located user-interface units, and further including a data-routing switch that is adapted to communicatively and selectively couple data between selected ones of the different types of user-controllable devices and the programmable data processor.

13. The signal-repeating device control arrangement of claim 12, wherein the data is communicatively coupled between the data-routing switch and the programmable data processor via infrared circuits located and arranged with the data-routing switch and the signal-repeating base-station, respectively.

14. A signal-repeating device control arrangement for use in a facility having different types of user-controllable devices that are co-located with respective user-interface units in various zones of the facility and that provide user-selectable information to the user, the respective user-interface units providing input selectors for controlling operation of the user-controllable devices, the signal-repeating device control arrangement comprising:
a user-interface control device having a user interface for receiving inputs from a user, having a transceiver for sending data wirelessly in response to the user inputs and for receiving data, and having a programmable configuration for providing user control over the different types of user-controllable devices;

for use in communicating with the zone-located user-controllable devices, a signal-repeating base-station including
   a base-station transceiver adapted to communicate data with the user-interface control device,
   a data-routing circuit adapted to respond to the user inputs received via the base-station transceiver by sending designated groups of digital data sets to various zones of the facility to manipulate operation of at least one of the different types of user-controllable devices, and
   a data port adapted to download information for configuring both the signal-repeating base-station and, via the base-station transceiver, for configuring the user-interface control device.

* * * * *